July 6, 1926.
W. J. ASHCRAFT
1,591,076
LEVEL AND PERPENDICULAR FINDING DEVICE
Filed August 8, 1924      2 Sheets-Sheet 2
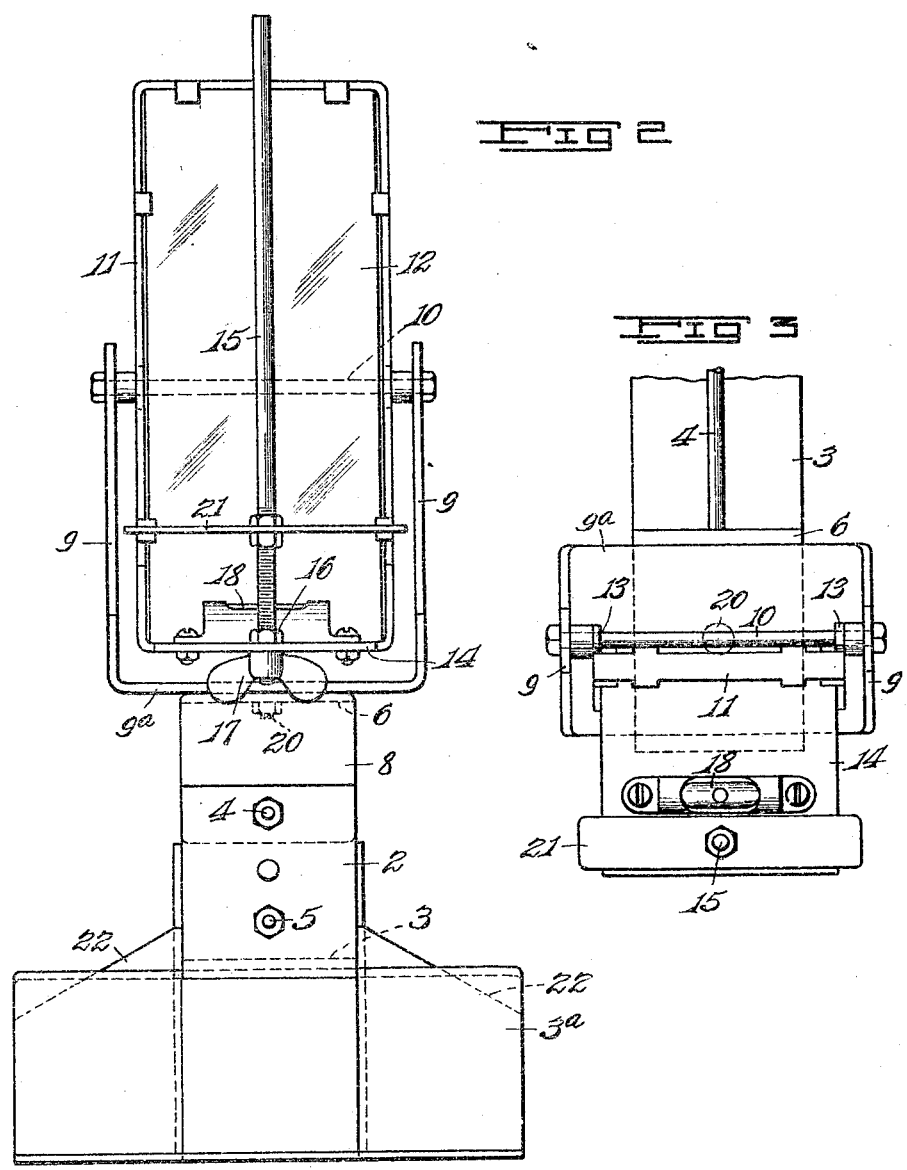
INVENTOR
W. J. Ashcraft.
BY
ATTORNEY Patented July 6, 1926.

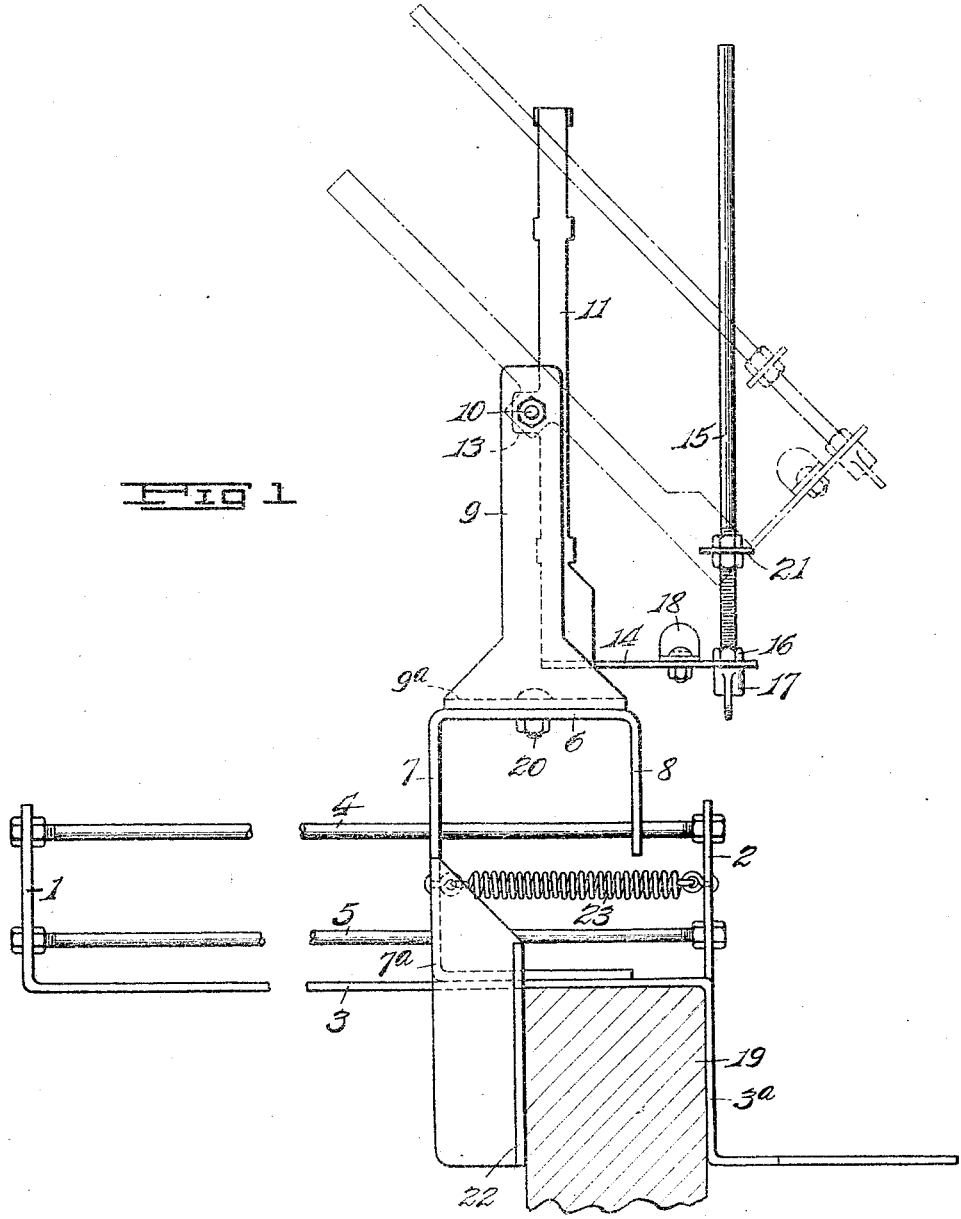

1,591,076

UNITED STATES PATENT OFFICE.

WENDELL J. ASHCRAFT, OF SHORT CREEK, WEST VIRGINIA, ASSIGNOR OF ONE-HALF TO L. W. McCLURE, OF SHORT CREEK, WEST VIRGINIA.

LEVEL AND PERPENDICULAR FINDING DEVICE.

Application filed August 8, 1924. Serial No. 730,870.

This invention relates broadly to builders' tools, and it has for its primary object to provide a device by means of which may be accurately ascertained or tested the perpendicularity of any structure or part of a structure irrespective of the height of the latter.

A further object is to provide an apparatus of the character mentioned which embodies a spirit level and which may be employed in ascertaining levels as well as perpendicularity.

In describing the invention in detail, reference is herein had to the accompanying drawings, in which—

Figure 1 is a side elevation of the invention, showing the same mounted for use;

Figure 2 is a front elevation of the invention; and—

Figure 3 is a partial top plan view of the same.

Referring to said drawings, 1 and 2 indicate the opposite upright ends of a plate 3, preferably of sheet metal, which constitutes a part of a supporting frame, and mounted in said ends 1 and 2 parallel to said plate 3 are the opposite ends of two tie rods 4 and 5 which serve as carriers or slideways for a carriage that comprises a platform 6 located over and parallel to said rods, and depending platform-supporting members 7 and 8, the latter being preferably integral with said platform. Said supporting members, apertured for the reception of said rods, are slidable on the latter for a purpose which will hereinafter be explained.

Pivotally mounted for rotary movement upon the platform 6 is the transverse member 9ª of a yoke-shaped support 9 which comprises parallel upright members. Mounted in said members 9 are the opposite ends of a horizontal rod 10, and mounted for rotary movement on said rod is a rectangular frame 11 in which is fitted a mirror 12. As herein shown, lugs 13 formed on the mirror frame 11 and disposed for rotary movement on the rod 10 constitute the connection between said rod and said mirror frame.

Rigidly carried by the mirror frame 11 at or adjacent to its lower end and at right angles to the plane of the mirror is a forwardly extending ledge 14 which carries thereon at a suitable point an upright post 15, said post being parallel to the plane of the mirror and having a height which approximates that of the mirror. While said post may be rigidly carried by the ledge 14, the same is herein shown to be adjustable, the lower end portion thereof being threaded and having a nut 16 and a wing-nut 17 thereon seated respectively against the upper and under faces of said ledge.

Also permanently located on the ledge 14 is a spirit level 18.

It is designed that the structure hereinbefore described shall be mounted in a level, or horizontal, position with the supporting frame resting upon any suitable support, as the timber 19 shown in Fig. 1, such position being determined by means of the spirit level 18. The yoke-shaped support 9 is then rotated on its pivot-pin or bolt 20 to dispose the mirror 12 in a position directly facing the object or thing either to be leveled or to be tested as to its perpendicularity. Then, according as such object or thing occupies a level above or below that of the device, the mirror frame is rotated rearwardly or forwardly on its supporting rod 10 to incline the mirror for bringing within the range of vision of the operator the mirror reflection of such object or thing. Then, employing the post 14 somewhat in the manner of a straight-edge or sighting line the operator may sight past the post at the reflection of the object or thing, which latter, when perpendicular, should appear precisely parallel to the post.

Carried by and preferably adjustable on the post adjacent to its lower end is a straight bar 21 or similar sighting member which occupies a position directly at right angles to said post and, consequently, true horizontal position. By sighting past said bar at the reflection in the mirror of an object to be leveled, the level of the latter may be accurately tested.

While the device may be otherwise constructed and arranged for mounting upon timbers, as 19, or the like, it is preferred that the plate 3 have an end downturned at a right angle to the plane thereof, as shown at 3ª, such end being adapted for seating closely against a side of the timber upon which the plate rests, as shown in Fig. 1. Said end 3ª is adapted to cooperate with opposite wings 22 formed on a depending extension 7ª formed on the platform-supporting member 7, whereby the apparatus is clamped in place. Said extension is connected to the upright end 2 of the plate 3 by a horizontally disposed retractile coil spring 23, the latter tending to maintain said member 7 and wings 7ª in a forwardly drawn position in which the latter yieldingly engage the opposite side of the timber. Obviously, the apparatus may be mounted upon any thickness of timber or other suitable like mounting within the range of sliding movement of the platform on the tie-rods 4 and 5.

From the foregoing it will be evident that the apparatus may be employed for leveling and testing the perpendicularity of any object or part of a building structure of which the reflection can be viewed in the mirror. Thus, the user or operator can employ the device at or near the ground for testing perpendiculars and levels at practically any elevation or distance therefrom.

While I have described the invention with more or less particularity, it will be manifest that wide variations in the forms and arrangement of parts may be made within the scope of the appended claims.

What is claimed is—

1. A device of the character described comprising a mirror, a support, said mirror being carried by said support and adapted for rotary shifting movement on a horizontal axis, a spirit level carried in permanently fixed relation to said mirror, and a sighting post located in front of and in fixed parallel relation to said mirror.

2. A device of the character described comprising a mirror, a support, said mirror being carried by said support and adapted for rotary shifting movement on a horizontal axis, a spirit level carried in fixed relation to said mirror, a sighting post located permanently in front of and in fixed parallel relation to said mirror, and a mounting for said support, said support being adapted for rotary movement on said mounting about a vertical axis.

3. A device of the character described comprising a mirror, a support, said mirror being carried by said support and adapted for rotary shifting movement on a horizontal axis, a spirit level carried in fixed relation to said mirror, and a sighting member located in front of and in permanent parallel relation to said mirror.

4. A device of the character described comprising a mirror, a support, said mirror being carried by said support and adapted for rotary shifting movement on a horizontal axis, a spirit level carried in fixed relation to said mirror, and sighting members located in front of and in permanently parallel relation to said mirror, one of said members being located parallel to the vertical axis and the other member parallel to the horizontal axis of said mirror.

5. A device of the character described comprising a mirror, a support, said mirror being carried by said support and adapted for rotary shifting movement on a horizontal axis, a spirit level carried in fixed relation to said mirror, a sighting member located in front of and in permanent parallel relation to said mirror, and a mounting for said support, said support being disposed for rotary movement on said mounting about a vertical axis.

6. A device of the character described comprising a mirror, a support, said mirror being carried by said support and adapted for rotary shifting movement on a horizontal axis, a spirit level carried in fixed relation to said mirror, a sighting member located in front of and in permanent parallel relation to said mirror, a mounting for said support, said support being disposed for rotary movement on said mounting about a horizontal axis, and means for clamping said mounting upon timbers or timber-like members.

In testimony whereof, I affix my signature.

WENDELL J. ASHCRAFT.